(12) United States Patent
Ruat et al.

(10) Patent No.: US 10,071,679 B2
(45) Date of Patent: Sep. 11, 2018

(54) LIGHTING DEVICE WITH MOBILE VANE

(71) Applicant: Valeo Vision, Bobigny (FR)

(72) Inventors: Olivier Ruat, Trelaze (FR); Stephane Patrizi, Montreuil Juigne (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/257,018

(22) Filed: Sep. 6, 2016

(65) Prior Publication Data

US 2017/0066369 A1    Mar. 9, 2017

(30) Foreign Application Priority Data

Sep. 8, 2015  (FR) ...................... 15 58331

(51) Int. Cl.
| | | |
|---|---|---|
| *F21V 17/02* | (2006.01) | |
| *B60Q 1/26* | (2006.01) | |
| *B60Q 1/44* | (2006.01) | |
| *F21S 8/10* | (2006.01) | |
| *F21S 43/145* | (2018.01) | |
| *F21S 43/237* | (2018.01) | |
| *F21S 43/245* | (2018.01) | |
| *F21S 43/19* | (2018.01) | |
| *F21V 14/02* | (2006.01) | |
| *F21Y 105/00* | (2016.01) | |
| *F21Y 115/15* | (2016.01) | |

(52) U.S. Cl.
CPC ............ *B60Q 1/2607* (2013.01); *B60Q 1/44* (2013.01); *F21S 43/145* (2018.01); *F21S 43/195* (2018.01); *F21S 43/237* (2018.01); *F21S 43/245* (2018.01); *F21S 48/212* (2013.01); *F21S 48/217* (2013.01); *F21S 48/2237* (2013.01); *F21S 48/2268* (2013.01); *F21V 14/02* (2013.01); *B60Q 2400/40* (2013.01); *F21Y 2105/00* (2013.01); *F21Y 2115/15* (2016.08)

(58) Field of Classification Search
None
See application file for complete search history.

(56) References Cited

U.S. PATENT DOCUMENTS

| | | |
|---|---|---|
| 7,407,304 B2 | 8/2008 | Tasson et al. |
| 7,427,151 B2 | 9/2008 | Okubo et al. |
| 2005/0099810 A1 | 5/2005 | Tasson et al. |
| 2006/0133104 A1 | 6/2006 | Okubo et al. |
| 2015/0060779 A1 | 3/2015 | Kawahara et al. |

FOREIGN PATENT DOCUMENTS

KR       101157645 B1    6/2012

*Primary Examiner* — Vip Patel
(74) *Attorney, Agent, or Firm* — Oblon, McClelland, Maier & Neustadt, L.L.P.

(57) ABSTRACT

A device for motor vehicle designed to emit light in a main direction of emission (X). The lighting device has at least one mount fixedly mounted in the lighting device, at least one vane, the vane being articulated to the mount and having a panel on which is arranged at least one light source suited to emitting light in a favored direction of radiation (Y), and an actuating device suited to causing the vane to pivot with respect to the mount between a rest position and an emission position in which the favored direction of radiation (Y) of the vane is close to the main direction of emission (X) or corresponds more or less to the main direction of emission (X) of the lighting device.

17 Claims, 3 Drawing Sheets

LIGHTING DEVICE WITH MOBILE VANE

CROSS-REFERENCE TO RELATED APPLICATIONS

This application claims priority to the French application 1558331, filed Sep. 8, 2015, which application is incorporated herein by reference and made a part hereof.

BACKGROUND OF THE INVENTION

1. Field of the Invention

The invention relates to the field of lighting devices for motor vehicles.

2. Description of the Related Art

In the known way, this type of device is tending to become more complex because of the increasing number of functions that these devices are called upon to implement. Notably listed among these functions is the creation of switch-on sequences, for example when the vehicle is started up, which offer a particular aesthetic look. This aesthetic look notably contributes to defining the overall appearance or "visual signature" of the vehicle in question, and differentiates it from other vehicles.

SUMMARY OF THE INVENTION

In this context, the invention seeks to offer a lighting device for motor vehicle that makes it possible to define a particular visual signature for this vehicle while at the same time having optimized compactness, reliability and design.

To this end, the invention relates to a lighting device for motor vehicle, the lighting device being designed to emit light in a main direction of emission and comprising:

at least one mount fixedly mounted in the lighting device;

at least one vane, the vane being articulated to the mount and having a panel on which is arranged at least one light source suited to emitting light in a favored direction of radiation; and an actuating device suited to causing the vane to pivot with respect to the mount between a rest position and an emission position in which the favored direction of radiation of the vane is close to the main direction of emission or corresponds more or less to the main direction of emission of the lighting device.

For example, the mount is fixed to a housing of the lighting device which delimits a cavity in which the components of the device are arranged.

The mount or mounts for example have the overall shape of a U.

In one exemplary embodiment, the vane is articulated to the mount so as to pivot about a horizontal axis. This horizontal axis is, for example, orthogonal to the main direction of emission of the lighting device. Moreover, the rest and emission positions are, for example, positions at the end of travel of the vane. If appropriate, the actuating device is designed so that the vane can adopt only one or other of these positions for any meaningful length of time.

According to one aspect of the invention, in the emission position, the angular difference between the main direction of emission and the favored direction of radiation of the vane is less than 50°, or even less than 15°.

According to one aspect of the invention, in the rest position, the light source of the or each vane is visible in the direction of emission.

According to one aspect of the invention, the angular distance between the rest position and the emission position of the vane is greater than 40°.

According to one aspect of the invention, the device comprises at least two vanes each having a panel on which is arranged at least one light source, there being associated with each mount two vanes which are articulated to the mount and arranged on the mount symmetrically with respect to one another about the main direction of emission.

Advantageously, the actuating device is designed to cause the two associated vanes to move simultaneously.

According to one aspect of the invention, the actuating device comprises an actuator and a moving part to which the or each vane associated with the relevant mount is articulated, the actuator being suited to moving the moving part with respect to the mount in such a way as to cause each vane associated with the relevant mount to pivot simultaneously with respect to the mount between the rest position and the emission position.

The moving part has, for example, the overall shape of a U.

According to one aspect of the invention, each mount comprises at least one guide groove in which the moving part of the corresponding actuating device can move.

Because of the fixed nature of the mount with respect to the lighting device, the guide groove is itself fixedly mounted in the lighting device.

Advantageously, the moving part has dimensions, particularly in terms of the spacing between its two legs, that substantially complement those of the guide groove of the corresponding mount.

According to one aspect of the invention, the movement of the moving part by means of which movement the vane is pivoted with respect to the mount is a translational movement.

According to one aspect of the invention, each vane comprises a connecting arm of which a first end is fixed to the relevant panel, and of which a second end is, on the one hand, fixed to the relevant mount via a first axis and, on the other hand, fixed to the associated moving part via a second axis.

The second end of the connecting arm comprises, for example, a first orifice to house the first axis. The first axis is, for example, also housed in passages arranged at the free end of each of the two legs that each mount comprises.

The first axis may be formed by an additional component, which means to say by a dedicated component embodying the axis concerned.

As an alternative, the first axis is embodied in the form of two first journals formed on one of the two components that are the mount and the connecting arm and which are intended to collaborate with first orifices formed in the other of the two components that are the mount and the connecting arm.

Moreover, the second end of the connecting arm is, for example, fixed to the mount by the first axis at the level of the walls of the guide groove.

According to one aspect of the invention, the second end of the connecting arm comprises an orifice to accept the second axis, the orifice having a cylindrical overall shape of oblong cross section.

The second axis is, for example, a dedicated component forming the second axis concerned.

As an alternative, the second axis is formed by two second journals borne by the moving part and intended to collaborate with the orifice. As an alternative, the connecting arm may comprise the second journals while the moving part comprises the orifice of oblong cross section.

According to one aspect of the invention, the actuator comprises a motor, a link rod connected to the motor and a connecting actuating cylinder connecting the link rod to the moving part.

However, as an alternative, the actuator comprises a shape-memory wire associated with a spring. According to one aspect of the invention, the device comprises at least two mounts which are fixed with respect to the housing and the device further comprises a framework that is fixed relative to the housing and on which the or each mount is arranged, the mounts being spaced apart along the framework.

Advantageously, the device comprises at least one vane mounted with the ability to move on each mount and on which at least one area light source is arranged.

According to one aspect of the invention, the device further comprises a control unit suited to causing each vane to pivot according to an actuation sequence during the course of which the vanes associated with different mounts are pivoted between their rest and emission positions sequentially from one mount to another in a given direction of travel over the framework.

Advantageously, the control unit is also designed to control the switching-on of the light sources.

For example, the control unit is configured to switch each light source on in parallel with the movement of the vane on which it is arranged. As an alternative, the control unit may be designed to switch all of the light sources on prior to the movements of the vanes. According to one example, all of the light sources may be arranged so that together they form a scrolling turn signal function.

According to one aspect of the invention, the framework delimits a cavity and the lighting device further comprises a lighting module comprising at least one light guide of elongate shape extending into the cavity delimited by the framework.

According to one aspect of the invention, the or at least one light source is an area light source, notably an organic light emitting diode, covering all or part of the surface of the panel of the relevant vane.

An "area light source" means a source of light that has a light emission surface area and the thickness of which is negligible in comparison with the dimensions of this light emission surface area.

The area light source may advantageously be an organic light emitting diode or OLED. If appropriate, the light emitting surface area of the OLED may be greater than 1 cm².

As an alternative, the area light source may be a lighting panel formed by a collection of optical fibers, notably juxtaposed, braided or intermingled fibers, the optical fibers being associated with one or more light sources, notably comprising one or more light emitting diodes LED. If appropriate, the light source or sources may be designed to emit light in the ends of the optical fibers, the optical fibers being designed to diffuse this light via outlet faces of these fibers formed on their envelope over all or part of their length, the collection of the outlet faces thus together forming the area light source, in this case also referred to as FOLED.

The invention also relates to a method for using a lighting device according to any one of the preceding claims, the method involving:

switching on at least one light source of a vane; and moving the or at least one vane between the rest position and the emission position by means of the actuating device.

According to one aspect of the invention, the method involves:

switching on all of the light sources of the lighting device; and moving each vane between the rest position and the emission position, the vanes associated with a given mount being pivoted simultaneously, the vanes respectively associated with different mounts being pivoted with a temporal offset in a predefined order.

According to one aspect of the invention, the vanes associated with different mounts are pivoted between their rest and emission positions sequentially from one mount to another in a given direction of travel over the framework.

These and other objects and advantages of the invention will be apparent from the following description, the accompanying drawings and the appended claims.

BRIEF DESCRIPTION OF THE ACCOMPANYING DRAWINGS

The invention will be more clearly understood from reading the detailed description which will follow, which is given solely by way of example and with reference to the attached figures in which.

DETAILED DESCRIPTION OF THE PREFERRED EMBODIMENTS

Figure 1:
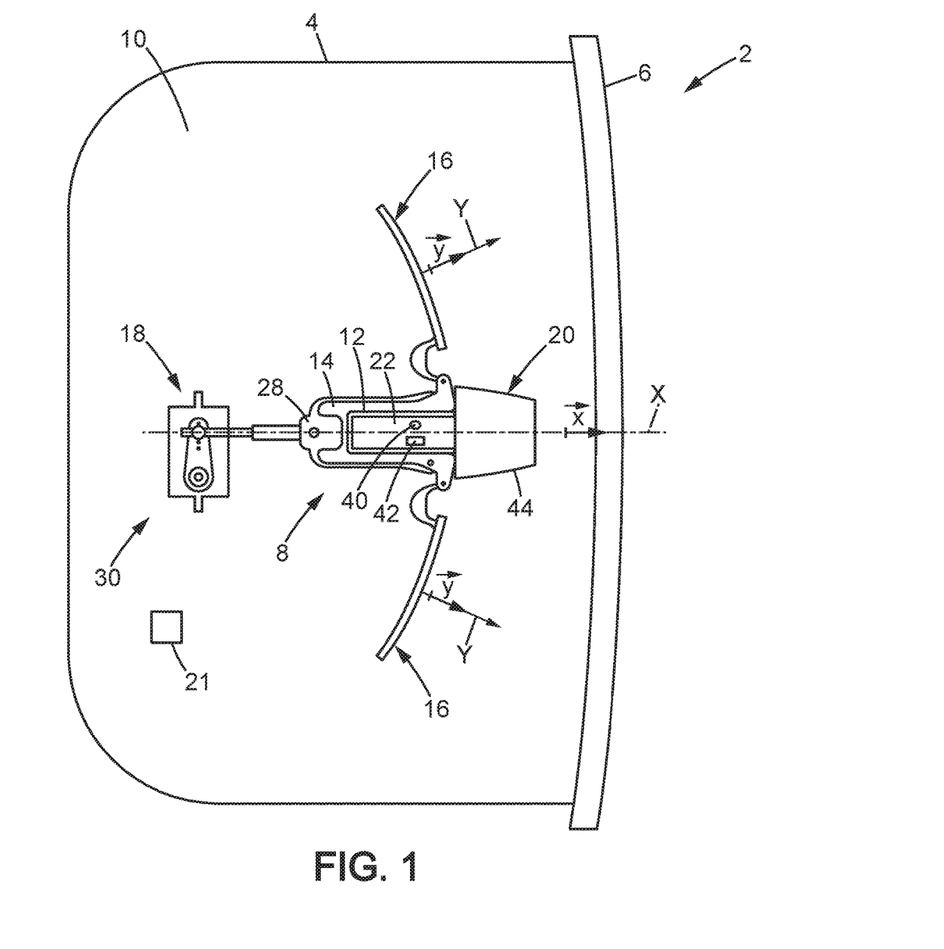
FIG. 1 is a schematic illustration of a lighting device according to the invention.

FIG. 1 illustrates a lighting device according to the invention.

FIG. 1 illustrates a device 2 according to the invention. The device 2 is a lighting device for motor vehicle lighting or signaling. For example, the device 2 is a vehicle main headlamp, a high-beam headlight, a low-beam headlight, a turn signal or a tail light.

In the example of FIG. 1, the device 2 is a tail light.

The device 2 is suited to emitting light in a main direction of emission denoted X.

The device 2 comprises a housing 4, an outer lens 6 and a light emitting module 8, hereinafter module 8.

The housing 4 internally delimits a cavity 10 in which the module 8 is arranged. The cavity 10 is closed off at the front by the outer lens 6.

The housing 4 and the outer lens 6 are made, for example, from known materials using a known method of manufacture.

The module 8 comprises a framework 12, at least one mount 14, at least one vane 16 suited to emitting light, and at least one actuating device 18 configured to cause the vane 16 to move. Furthermore, the module 8 comprises a lighting module 20 and a control unit 21.

The framework 12 is fixed to the housing 4. The framework 12 takes the form of an elongate component which is in the overall shape of a U in cross section. It thus delimits on the inside a cavity 22 to which the lighting module 20 is attached, as described hereinafter. It may be noted that the cavity 22 is, in certain embodiments, also used for the passage of the connections for the device 2, particularly the connections needed to supply electrical power to the various components of the device 2.

The framework 12 extends substantially horizontally between the lateral walls of the housing 4, to which walls it is fixed. It is arranged inside the housing 4 in such a way that the cavity 22 is open toward the front of the device 2.

It will be noted that, in certain embodiments, the framework 12 is curved, its curvature being oriented toward the rear of the device 2.

The framework 12 is made for example from a mask of the device 2 used for concealing the unaesthetic parts such as the wiring harnesses, and a part of which is designed to accept mounts 14.

Figure 2A:
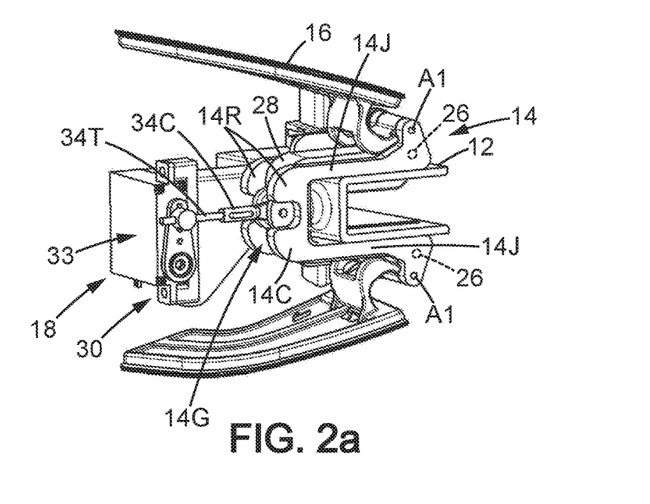
FIGS. 2a and 2b are views of the lighting device of FIG. 1.
Figure 2B:
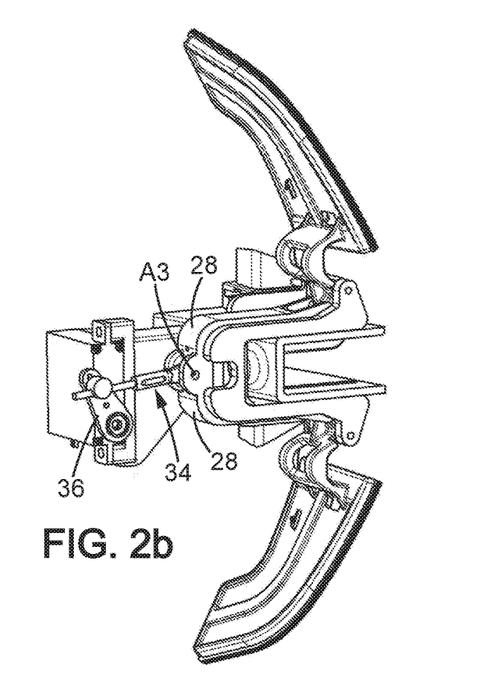

With reference to FIGS. 1, 2a and 2b, the device 2 comprises a plurality of mounts 14 fixedly mounted in the device 2. In the example of the figures, these are fixed to the framework 12, which is itself fixed to the housing 4.

The mounts 14 are offset from one another along the framework 12. For example, they are evenly spaced apart.

In the example of FIG. 1, the device 2 comprises five mounts 14.

Associated with each mount 14 is at least one vane 16. Advantageously, each mount 14 has, associated with it, at least two vanes 16 which are arranged symmetrically on the mount 14 relative to one another about the direction X.

With reference to FIGS. 1, 2a and 2, each mount 14 has the overall shape of a U. In other words, each mount 14 has two legs 14J and a central portion 14C joining the two legs 14J. The two legs 14J are substantially parallel to one another.

The dimensions of the U-shaped cross section of each mount 14 more or less complement that of the U-shaped cross section of the framework 12. Each mount 14 is fitted onto the framework 12 and fixed thereto.

With reference to FIG. 2a, each mount 14 comprises a guide groove 14G for guiding a moving part 28 of the actuating device 18.

The guide groove 14G is formed in the thickness of the mount 14. Advantageously, this guide groove 14G extends all around the periphery of the mount 14.

The guide groove 14G takes the form of a removal of material performed over a portion of the thickness of the mount 14. The guide groove 14G thus forms a channel in the flanks of the legs 14J and of the central portion 14C. It further delimits two rims 14R (FIG. 2a) of the relevant mount 14.

Furthermore, the free end of each leg 14J of each mount 14 comprises passages housing a first rotation axis A1. As described hereinafter, the vanes 16 associated with each mount 14 are articulated to the mount 14 by means of the first rotation axis A1.

Advantageously, the rims 14R of the central portion 14C are provided with an aperture in order to provide access to the articulation that articulates the moving part 28 mentioned hereinabove to the rest of the actuating device 18.

The mounts 14 are advantageously made from a material that offers a low coefficient of friction so as to minimize the effort required from the actuator.

Figures 3, 5:
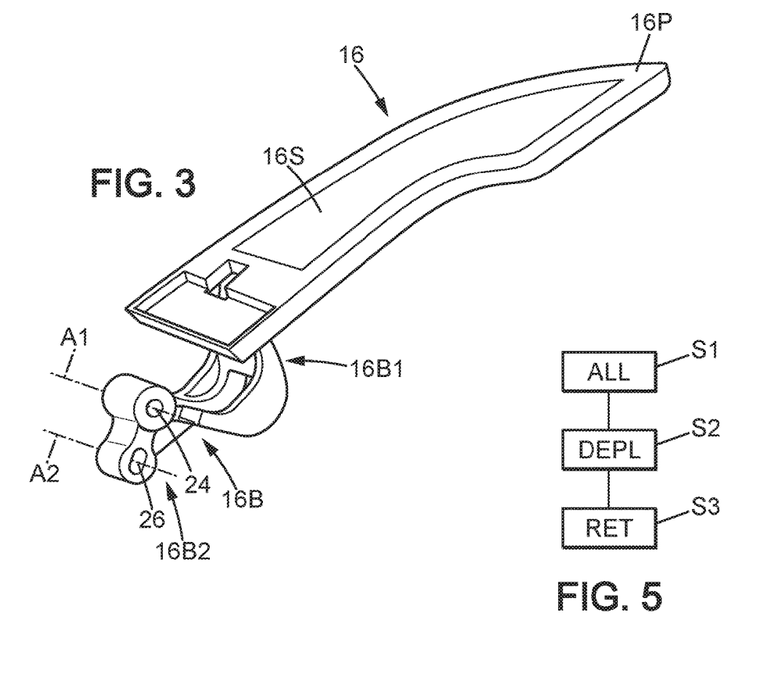
FIG. 3 illustrates a vane of the lighting device.
FIG. 5 is a block diagram of a method of using the lighting device according to the invention.

With reference to FIGS. 2a, 2b and 3, each vane 16 is articulated to the associated mount 14 via the first rotation axis A1 described hereinabove. Furthermore, each vane 16 is articulated to the moving part 28 mentioned hereinabove.

Each vane 16 has a panel 16P and a connecting arm 16B.

The panel 16P takes the form of a support of given surface area. The panel 16P is, for example, substantially planar. Alternatively, the panel 16P may have a slightly curved shape. Alternatively or in parallel, the panel 16P may have various portions forming a discontinuity between them. These portions are, for example, formed as integral parts with one another or, alternatively, fixed to one another.

Furthermore, the panel 16P has a surface of any shape. In the example of FIG. 3, the panel 16P is in the overall shape of an L.

Each panel 16P is suited to emitting light in a favored direction of radiation denoted Y.

The direction Y corresponds for example to a direction normal to the panel 16P. This normal is, for example, the normal to the central part of the panel 16P when the latter has a uniform curvature. In other embodiments in which the panel 16P has portions forming discontinuities between them, this direction corresponds for example to the normal to a chosen portion of the panel 16P.

This chosen portion is, for example, the portion that makes the smallest angular distance with the direction X.

To this end, each panel 16P comprises at least one light source 16S.

In the context of the invention, the light source 16S is an area light source. As indicated hereinabove, that means a light source having a light emitting surface area and the thickness of which is negligible in comparison with the dimensions of this light emitting surface area.

Advantageously, the light source 16S of at least one of the panels 16P is a photoemissive semiconductor element of organic type. This type of photoemissive element is an organic light emitting diode known by its English-language acronym OLED, which stands for "Organic Light Emitting Diode".

The light source 16S forms a photoemissive film arranged on the panel 16P. This film covers all or part of the surface of the panel 16P. Advantageously, the light source 16S covers more or less the entirety of the surface of the panel 16P.

The light source 16S is, for example, fixed to the panel 16P by bonding.

Furthermore, the light source 16S is, for example, suited to emitting light that is red, or even orange, in color.

The connecting arm 16B is designed for connecting the vane 16 to the associated mount 14 and to the moving part 28 mentioned hereinabove.

The connecting arm 16B thus has a first end 16B1 fixed to the panel 16P. Advantageously, this fixing is performed at the rear of the panel 16P.

The connecting arm 16B also has a second end 16B2 for articulating the vane 16 to the mount 14 via the first rotation axis A1 described hereinabove, and for articulating the vane 16 to the moving part 28 via a second axis A2.

To this end, the second end 16B2 comprises a first orifice 24 for housing one of the first axes A1 of the relevant mount 14. The first orifice 24 is of cylindrical overall shape with substantially circular cross section.

will be noted that, in this embodiment, the first rotation axis A1 is a dedicated component of cylindrical shape and forming the axis in question.

However, as an alternative, the first rotation axis A1 is embodied as two first journals formed on one of the two components that are the associated mount 14 and the connecting arm 16B and which are intended to collaborate with first orifices 24 formed in the other of the two components that are the mount 14 and the connecting arm 16B. Advantageously, the first rotation axes A1 are arranged horizontally (with respect to the orientation of the figure). In the example of the figures, the first rotation axes A1 are thus orthogonal to the direction of emission X. The vanes 16 are therefore suited to pivoting about an axis perpendicular to the main direction of emission X.

The second end 16B2 of the connecting arm 16B further comprises a second orifice 26 for housing the second axis A2.

Advantageously, the second orifice 26 has a cylindrical overall shape of oblong cross section. In certain embodiments, this oblong cross section is rectilinear. As an alternative, this oblong cross section is curved.

The shape of the cross section of this second orifice 26 has the effect of allowing the vane 16 to rotate under the effect of a translational movement imparted to the moving part 28 of the actuating device 18.

In the example above, the second axis A2 is a dedicated component forming the relevant axis.

As an alternative, the second axis A2 is embodied by two second journals borne by the moving part 28 and intended to collaborate with the second orifice 26. As an alternative, the connecting arm 16B may comprise the second journals while the moving part 28 comprises the orifice of oblong cross section. Moreover, advantageously, the second end 16B2 is fixed to the corresponding mount 14 at the level of the guide groove 14G, and more specifically at the level of the rims 14R that delimit same. This fixing is, for example, achieved at a region that the moving part 28 cannot reach during its movements. For example, it is achieved at protuberances that the rims 14R have and that extend laterally to the spread of the corresponding leg 14J, at the free end of this leg 14J (FIGS. 2a and 2b).

Referring once again to FIGS. 2a and 2b, the device 2 comprises, for each mount 14, an actuating device 18. Each actuating device 18 is configured to cause the vane or vanes 16 associated with the relevant mount 14 to move with respect to this mount 14 between a rest position illustrated in FIG. 2a and an emission position illustrated in FIG. 2b.

The rest and emission positions are, for example, end-of-travel positions of the vane 16.

In certain embodiments, the actuating device 18 is designed so that the associated vane or vanes 16 can adopt only one or other of these positions for any meaningful length of time. In other words, intermediate positions are envisioned only as transient positions in the pivoting between the rest position and the emission position (or vice versa) but not as positions in which the vanes 16 come to a halt.

In the emission position, the panel 16P of the vanes 16 more or less faces the emission direction X. The panel 16P can therefore be seen in the direction of emission X at an angle that is not a glancing angle.

In the rest position, the panel 16P of the vanes 16 does not face the direction of emission X. For example, it is then hidden by the framework 12 and is not visible. Alternatively, in the example of the figures, in the rest position, the panel 16P of the vanes 16 is visible in the direction X at an angle that is a small or even a glancing angle.

In other words, in the emission position, the favored direction of radiation Y of a given vane 16 is close to the direction X or corresponds more or less to the direction X.

Within the meaning of the present invention, "close to" means that the angular distance in terms of absolute value between the directions X and Y is less than or equal to 50°. Advantageously, this angular distance is less than 15°.

The angular distance is considered in the plane of FIG. 1. For example, this angular distance is substantially equal to 25°. This angular distance thus corresponds to the angle of elevation of the favored direction of radiation Y of the vane 16 with respect to the main direction of emission X of the device 2, and corresponds to the oriented angle identified by the vectors $\vec{x}$ and $\vec{y}$ in FIG. 1.

In the rest position, the angular distance between these directions is greater than or equal to 70°. It has, for example, the value 75°.

Other angular configurations in either one of these positions are possible.

In general, the angular distance between the rest and emission positions is advantageously greater than or equal to 40°, and preferably greater than or equal to 50°. The angular distance chosen is then obtained by selecting notably the shape and dimensions of the cross section of the second orifice 26 of the panel 16P and the length of travel of the moving part 28 described herein below.

As indicated previously, the actuating device 18 is configured to cause at least one vane 16 to move.

More specifically, associated with each mount 14 is an actuating device 18 suited to causing the two vanes 16 associated with the relevant mount 14 to move. Advantageously, the actuating device 18 is then configured to cause the two vanes 16 associated with the relevant mount to move simultaneously.

Each actuating device 18 comprises a moving part 28. Furthermore, it comprises an actuator, or drive mechanism 30.

Figure 4:
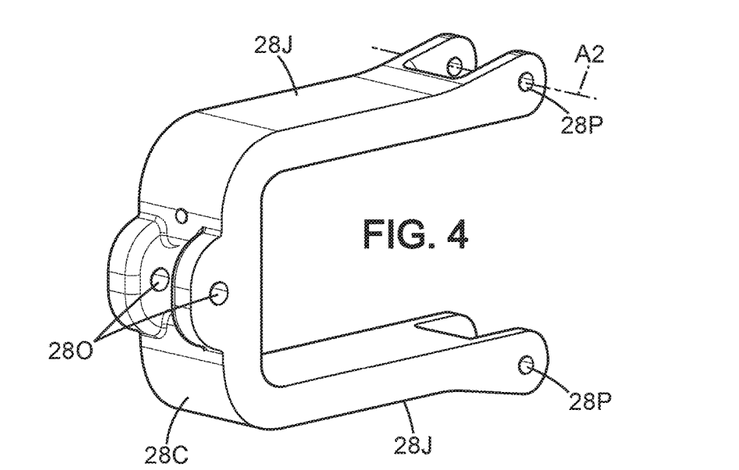
FIG. 4 illustrates a moving part of the lighting device of FIG. 1.

With reference to FIG. 4, the moving part 28 has the overall shape of a U. It thus comprises two parallel legs 28J and a central or connecting portion 28C connecting the two legs 28J.

The moving part 28 has dimensions, particularly in terms of the spacing between the two legs 28J, that more or less complement those of the guide groove 14G of the mount 14.

Each moving part 28 is coupled to a given mount 14. Each moving part 28 is more specifically fitted over the corresponding mount 14 in such a way that their respective U-shapes coincide. The moving part 28 is housed in the guide groove 14G and able to move therein in a translational movement.

In this translational movement, the legs 28J of the moving part 28 slide in the guide groove 14G along the legs 14J of the corresponding mount 14, as illustrated in FIGS. 2a and 2b. During this movement, the central or connecting portion 28C of the moving part 28 moves, remaining substantially parallel to the central or connecting portion 14C of the mount 14.

The free end of each leg 28J comprises a passage opening 28P to house the second axis A2 (FIG. 4) which is also housed in the second orifice 26 of the vanes 16 associated with the relevant mount 14.

The central portion 28C of the moving part 28 comprises two projections each comprising a passage orifice 28O. The passage orifices 28O are arranged facing one another and are designed to house an axis A3 (FIG. 2b) that allows the moving part 28 to be articulated to the drive mechanism 30.

The drive mechanism 30 in question comprises a motor 33, a connecting actuating cylinder 34 and a link rod 36.

The motor 33 is configured to cause the link rod 36 to rotate as it operates.

The connecting actuating cylinder 34 kinematically connects the moving part 28 to the motor 33 and to the link rod 36.

It has a cylinder 34C in which there is arranged a mobile piston (not depicted) bearing a rod 34T the free end of which is fixed to the link rod 36. The actuating cylinder 34 is itself fixed to the moving part 28 via the axis A3.

The link rod 36 is configured to actuate the connecting actuating cylinder 34 and the moving part 28 when the motor is in operation.

With reference to FIG. 1, the lighting module 20 is configured to perform a specific lighting function of the device 2. In the example of the figures, the lighting module 20 is thus configured to perform the tail light lighting function.

To this end, the lighting module 20 comprises at least one light guide 40. In the example of the figures, the lighting module 20 comprises two light guides 40 and 42. The light guides 40, 42 have an elongate overall shape and extend into the cavity 22 delimited by the framework 12.

The first light guide 40 has, for example, a circular cross section.

The second light guide 42 has, for example, a cross section that is something other than circular.

The two light guides 40, 42 are coupled at one of their ends to a light source (not depicted) which injects into the light into the corresponding light guide 40, 42. These light guides 40, 42 moreover have prisms in the form of reliefs formed in their surface, for example at their rear part, and configured to deflect the light traveling along the corresponding light guide 40, 42 into the direction X.

The lighting module 20 further comprises a closure outer lens 44 configured to confer a particular appearance upon the light emitted by the light guides 40, 42.

For example, the closure outer lens 44 has opalescent properties.

The control unit 21 is configured to control the various actuating devices 18 of the device 2. In the embodiment of the figures, it is configured in particular to control the switching-on of the motors 33 of the actuating devices 18.

Advantageously, it is also configured to control the switching-on and switching-off of the light sources 16S borne by the various vanes 16.

For example, the control unit 21 is configured to switch each light source 16S on and, at the same time as switching on a given light source 16S, to command the movement of the vane 16 on which it is arranged.

As an alternative, the control unit 21 is configured to switch all of the light sources 16S on prior to the movements of the vanes 16.

According to one exemplary embodiment, the control unit 21 is configured to switch the collection of light sources 16S on and/or off in order to create a scrolling turn signal function.

The control unit 21 comprises for example a programmable microcontroller.

It will be noted that the control unit 21 is, for example, situated in the device 2. Alternatively, it is situated outside the device 2.

Advantageously, the control unit 21 is configured to cause each vane 16 to pivot in an actuating sequence during which the vanes 16 associated with various mounts 14 are pivoted between their rest and emission positions sequentially from one mount 14 to another in a given direction of travel over the framework 12.

The way in which the device 2 works will now be described with reference to the figures.

In an initial configuration, the light sources 16S are switched off, as are the light guides 40, 42.

Furthermore, the vanes 16 are in the rest position.

The following steps are performed for example in response to detection of a particular event. For example, they are performed following the switching-on of the vehicle on which the device 2 is mounted. In that sense, the following method forms what is generally referred to by its English name as a "welcome scenario".

During an initial step S1, the control unit 21 commands the switching-on of all or some of the light sources 16S. The light sources 16S then form lighting films covering all or part of the panel 16P of the relevant vane 16.

The switching-on of the light sources 16S is more particularly performed by the control unit 21 in a predetermined switch-on sequence.

In one example of a sequence, the light sources 16S are switched on sequentially one after another gradually in a given direction of travel over the framework 12.

In other words, the control unit 21 commands the switching-on of the light sources 16S associated with the two vanes 16 borne by a mount 14 situated at one end of the framework 12. Then, keeping these light sources 16S switched on, the vanes 16 of the next nearest mount 14 are switched on, and so on, until all of the light sources 16S of the device 2 have been switched on.

Note that for switching on the light sources 16S, the control unit 21 commands the application of power from a source of electrical energy (not depicted) to the light sources 16S.

As an alternative, all the light sources 16S are switched on simultaneously.

Once all of the light sources 16S have been switched on, or indeed in parallel with this switch-on sequence, during a step S2, the vanes 16 are pivoted in a predetermined sequence.

For example, during this sequence, the vanes 16 are pivoted sequentially one after another gradually in a given direction of travel over the framework 12. This direction is, for example, the same as the direction seen during step S1. Alternatively, it is the opposite direction.

In other words, the control unit 21 commands the actuating device 18 associated with a mount 14 situated at one end of the framework 12 to move the two vanes 16 of this mount 14 from the rest position into the emission position.

This movement is then demanded of the actuating device 18 of the next nearest mount 14, and so on, until all the vanes 16 have moved into the emission position.

Note that the pivoting of the vanes 16 associated with a mount 14 may be initiated when the vanes 16 associated with the previous mount 14 (within the meaning of the direction of travel over the framework 12 being considered) have not yet reached their emission position.

For this movement of the vanes 16 of a given mount 14 into the emission position, the control unit 21 commands the switching-on of the motor 33 of the relevant actuating device 18. The associated link rod 36 is therefore made to move. The rod 34T of the corresponding actuating cylinder 34 is therefore moved such that the associated piston comes to the end of its travel in the relevant cylinder 34C and applies a pull to the moving part 28 to which it is fixed.

This pull results in the translational movement of the moving part 28 relative to the associated mount 14 in a translational movement parallel to the direction of the legs 14J of the mount 14 in the guide groove 14G.

As this happens, the walls of the passage openings 28P at the end of the leg 28J pull on the two corresponding axes A2. These axes A2 move in the corresponding second orifice 26 of the associated vanes 16, causing these vanes 16 to rotate about their axis A1 and causing the panel 16P of these vanes 16 to rotate from the rest position into the emission position.

Once the vane pivot sequence is complete, during a step S3, the vanes 16 are returned to the rest position and the light sources 16S are switched off. To do that, the control unit 21 commands the actuating devices 18 to effect the translational movement of the moving parts 28 in the direction of the mounts 14. For a given moving part 28, this translational movement causes the piston of the associated actuating cylinder 34 to move to the end of the cylinder 34C, then causes the cylinder 34C to move toward the mount 14, thereby causing the translational movement of the moving part 28 in the guide groove 14G of the corresponding mount 14. The axes A2 borne by the mount 14 are moved in the second orifice 26 then urge the connecting arm 16B of the vane 16 to cause the vanes 16 to pivot toward their rest position.

This step is optionally conducted according to a predetermined sequence. This sequence for example involves sequentially or simultaneously switching off the light sources 16S and sequentially or simultaneously pivoting the vanes 16, these actions being conducted in a chosen order.

In parallel with one or more of these steps or, alternatively, after these steps, the lighting module 20 is commanded to emit by the control unit 21, in order to achieve the corresponding lighting function. In the example of the figures, the lighting module 20 is, for example, commanded to emit in response to a braking of the vehicle.

The device 2 according to the invention offers several advantages.

In particular, it allows an improved light signature to be achieved through the movement of lighting surfaces, throughout this exhibiting a style that is robust, compact and simple.

Furthermore, the use of diodes of the OLED type improves the overall appearance of the device 2.

Furthermore, it relies on the conversion of a translational movement into a rotational movement in order to cause the vanes 16 to move, and is therefore more robust.

At the same time, the moving parts 28 of the device 2 and the actuating devices 18 do not impede the performance of the other functions of the device 2, such as the regulation tail light function when the device 2 is a motor vehicle tail light.

Other embodiments are conceivable.

In particular, as an alternative, the actuating device 18 causes a vane 16 to pivot by means of a shape-memory wire and of a spring. The shape-memory wire is associated with one direction of rotation of the vane 16, the spring being associated with the opposite direction of rotation.

This wire and spring for example replace the link rod 36, the motor 33 and the connecting actuating cylinder 34. The control unit 21 is then configured to command the supply of electrical power to the shape-memory wire in order to raise the temperature thereof and cause it to revert to the memorized shape, and to interrupt this application of power in order to lower the temperature thereof and allow it to deform, so that the vane 16 can pivot under the influence exerted by the spring.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for motor vehicles, said lighting device emitting light in a main direction of emission and comprising:
   a mount fixedly mounted in said lighting device;
   a vane being articulated to said mount and having a panel on which is arranged a light source which emits light in a favored direction of radiation; and
   an actuating device which causes said vane to pivot with respect to said mount between a rest position and an emission position, said favored direction of radiation of said vane is closer to said main direction of emission of the lighting device in the emission position than in the rest position,
   wherein said actuating device comprises an actuator and a moving part to which said vane associated with said mount is articulated, said actuator moving said moving part with respect to said mount in such a way as to cause said vane associated with said mount to pivot with respect to said mount between said rest position and said emission position, and
   wherein said moving part moves linearly between said rest position and said emission position in a direction parallel to said main direction of emission, and said vane pivots with respect to said mount about a pivot axis which is perpendicular to said main direction of emission.

2. The lighting device according to claim 1, wherein in said rest position, said light source of said vane is visible in said main direction of emission.

3. The lighting device according to claim 2, wherein the lighting device comprises two vanes each having said panel on which is arranged said light source, said two vanes are articulated to said mount and arranged on said mount symmetrically with respect to one another about said main direction of emission.

4. The lighting device according to claim 1, wherein the lighting device comprises two vanes each having said panel on which is arranged said light source, said two vanes are articulated to said mount and arranged on said mount symmetrically with respect to one another about said main direction of emission.

5. The lighting device according to claim 1, wherein said mount comprises a guide groove in which said moving part of said actuating device can move.

6. The lighting device according to claim 5, wherein said vane comprises a connecting arm including a first end which is fixed to said panel, and a second end which is fixed to said mount via a first axis and is fixed to said moving part via a second axis.

7. The lighting device according to claim 1, wherein said vane comprises a connecting arm including a first end which is fixed to said panel, and a second end which is fixed to said mount via a first axis and is fixed to said moving part via a second axis.

8. The lighting device according to claim 7, wherein said second end of said connecting arm comprises an orifice to accept said second axis, said orifice having a cylindrical overall shape of oblong cross section.

9. The lighting device according to claim 7, wherein said moving part presents an overall shape of a U, and includes first and second parallel legs and a central portion connecting the first and second legs, and
   wherein an end of the first leg is connected to said connecting arm of said vane via said second axis.

10. The lighting device according to claim 1, wherein said lighting device comprises first and second mounts which are fixed with respect to a housing, first and second vanes respectively articulated to the first and second mounts, the first and second vanes respectively having first and second panels on which is respectively arranged first and second light sources, and said lighting device further comprises a framework that is fixed relative to said housing and on which said first and second mounts are arranged, said first and second mounts being spaced apart along said framework.

11. The lighting device according to claim 10, wherein said lighting device further comprises a control unit configured to cause said first and second vanes to pivot according to an actuation sequence during which said first and second vanes are pivoted between said rest position and said emission position sequentially from said first mount to said second mount in a given direction of travel over said framework.

12. The lighting device according to claim 11, wherein said framework delimits a cavity and said lighting device further comprises a lighting module comprising a light guide of elongate shape extending into said cavity delimited by said framework.

13. The lighting device according to claim 10, wherein said framework delimits a cavity and said lighting device further comprises a lighting module comprising a light guide of elongate shape extending into said cavity delimited by said framework.

14. The lighting device according to claim 1, wherein said light source is an area light source covering all or part of a surface of said panel of said vane.

15. A method for using a lighting device according to claim 1, said method comprising:

switching on said light source of said vane; and moving said vane between said rest position and said emission position by said actuating device.

16. The method according to claim 15, wherein the lighting device comprises first and second mounts which are fixed with respect to a housing, first and second vanes respectively articulated to the first and second mounts, the first and second vanes respectively having first and second panels on which is respectively arranged first and second light sources, and said lighting device further comprises a framework that is fixed relative to said housing and on which said first and second mounts are arranged and spaced apart along said framework, and the method comprising: switching on said first and second light sources of said lighting device; and moving said first and second vanes between said rest position and said emission position in a predefined order along said framework.

17. The method according to claim 16, wherein said lighting device comprises a control unit configured to cause said first and second vanes to pivot according to an actuation sequence which said first and second vanes are pivoted between said rest position and said emission position sequentially from said first mount to said second mount in a given direction of travel over said framework.

* * * * *